(12) United States Patent
Echihabi et al.

(10) Patent No.: US 11,734,516 B2
(45) Date of Patent: *Aug. 22, 2023

(54) SYSTEMS AND METHODS TO GENERATE MESSAGES USING MACHINE LEARNING ON DIGITAL ASSETS

(71) Applicant: SDL Inc., Wakefield, MA (US)

(72) Inventors: Abdessamad Echihabi, Los Angeles, CA (US); Bryant Huang, Santa Clarita, CA (US); Quinn Lam, Los Angeles, CA (US); Mihai Vlad, London (GB)

(73) Assignee: SDL Inc., Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,841

(22) Filed: Jan. 24, 2022

(65) Prior Publication Data

US 2022/0150192 A1 May 12, 2022

Related U.S. Application Data

(63) Continuation of application No. 16/155,658, filed on Oct. 9, 2018, now Pat. No. 11,256,867.

(51) Int. Cl.
| | |
|---|---|
| *G06F 40/30* | (2020.01) |
| *G06F 3/0484* | (2022.01) |
| *G06F 3/0482* | (2013.01) |
| *G06N 20/00* | (2019.01) |
| *G06F 40/166* | (2020.01) |
| *G06F 40/106* | (2020.01) |
| *H04L 51/02* | (2022.01) |

(52) U.S. Cl.
CPC ............ *G06F 40/30* (2020.01); *G06F 3/0482* (2013.01); *G06F 3/0484* (2013.01); *G06F 40/106* (2020.01); *G06F 40/166* (2020.01); *G06N 20/00* (2019.01); *H04L 51/02* (2013.01)

(58) Field of Classification Search
CPC ........ G06F 40/30; G06F 40/10; G06F 40/106; G06F 40/131; G06F 40/20; G06F 40/40; G06F 40/42; G06F 40/55; G06F 40/56
USPC .............................. 704/9, 1, 2, 4, 5, 10, 257
See application file for complete search history.

(56) References Cited

U.S. PATENT DOCUMENTS

| | | | |
|---|---|---|---|
| 8,407,217 B1 | 3/2013 | Zhang | |
| 11,256,867 B2 | 2/2022 | Echihabi et al. | |
| 2003/0163790 A1* | 8/2003 | Murata | G06F 16/345 |
| | | | 707/E17.094 |
| 2008/0270930 A1 | 10/2008 | Slosar | |
| 2015/0032645 A1 | 1/2015 | McKeown | |
| 2016/0103875 A1* | 4/2016 | Zupancic | G06F 40/253 |
| | | | 707/773 |
| 2017/0052954 A1 | 2/2017 | State et al. | |
| 2017/0083523 A1 | 3/2017 | Philip et al. | |

(Continued)

*Primary Examiner* — Qi Han
(74) *Attorney, Agent, or Firm* — Carr & Ferrell LLP

(57) ABSTRACT

Systems and methods of machine learning for digital assets and message creation are provided herein. The present disclosure includes mechanisms for receiving one or more assets that include textual content, performing machine learning on the one or more assets in order to determine relevant words, phrases, and statistics included in the textual content, and displaying segments of data on a graphical user interface that also includes an interface that is used to create a message using content of the segments of the textual content that have been extracted from the one or more assets.

21 Claims, 15 Drawing Sheets

(56) References Cited

U.S. PATENT DOCUMENTS

2018/0060287 A1 3/2018 Srinivasan et al.
2020/0110802 A1 4/2020 Echihabi et al.

* cited by examiner

FIG. 3A

**SDL* Copywriting Assistant** — eBOOK - Global Content Operating Model

✎ SUMMARY — +

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

🔍 SPOTLIGHT

- ○○○○○ A global content operating model can alleviate challenges and provide clear benefits.
- ○○○○○ Once a company has optimized its Global Content Operating Model, content drives experiences that meet customer expectations.
- ○○○○○ Forrester developed a hypothesis asserting that companies will need a global content operating model that balances global efficiency with local control
- ○○○○○ Our study found that companies see value in a global content operating model regardless of the number languages that need to be supported.
- ○○○○○ While only 19% of enterprises have a global content operating model today, an additional 48% plan to adopt one in the next two years.
- ○○○○○ The Global Content Operating Model (GCOM) provides a comprehensive strategic approach to managing your content across departments by unifying platforms and processes to address global content creation, translation and delivery.
- ○○○○○ The company employs everything learned from previous phases, building on existing processes, technology and skill sets to realize a fully Autonomous Global Content Operating Model.

🔎 KEYWORDS — +

- ⛓ Forrester
- 🌱 Grow
- ▫ content
- ▫ companies

❝ QUOTES — +

- ▫ a company can scale and replicate.
- ▫ companies see value in a global content operating model regardless of the number of languages that need to be supported
- ▫ companies will need a global content operating model that balances global efficiency with local control.
- ▫ nearly half of enterprises are planning to move a global content operating model within 24 months, anticipating better brand consistency and improved customer experience. —306

📊 STATS

- ▫ ...global content operating model within 24 months, anticipating better brand consistency ...
- ▫ Forrester conducted in-depth surveys with 151 business and IT professionals in the ...
- ▫ Forrester's study yielded five key findings:

✎ SMART CHANNEL EDITOR

GlobalContentOperatingModel   #Forrester   #AutonomousGlobalContentOperatingModel
                                    316   320
🐦 Twitter  ✉ Email  📝 Blog                    310

Compose a Tweet

[ Type your tweet here ]

280 characters left   [ +Add ]   [ × Clear ]

FIG. 3B

- a global content operating model
- Global Content Operating Model
- a company
- consumers
- customers
- artificial intelligence
- the customer experience
- multilingual content
- time-to-market

- While only 19% of enterprises have a global content operating ...
- ...plan to adopt one in the next two years.

ASSETS — 322 +

⬆ Upload More

☒ Forrester-Global Content Operating Model.txt (1948 bytes)

☒ eBook-Global Content Operating Model.txt (4716 bytes)

Power by Hai

FIG. 3B (Continued)

**SDL* Copywriting Assistant**

☆ SUMMARY — +

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

🔍 KEYWORDS — +

- companies
- a global content operating model
- Global Content Operating Model
- a company
- consumers
- customers eBOOK - Global Content Operating Model ▸

🔍 SPOTLIGHT — +

- ○○○○ Forrester conducted in-depth surveys with 151 business and IT professionals in the US, and found that nearly half of enterprises are planning to move to a global content operating model within 24 months, anticipating better brand consistency and improved customer experience.
- ○○○○ While only 19% of enterprises have a global content operating model today, an additional 48% plan to adopt one in the next two years.
- ○○○○ A global content operating model can alleviate challenges and provide clear benefits.
- ○○○○ Once a company has optimized its Global Content Operating Model, content drives experiences that meet customer expectations.
- ○○○○ Forrester developed a hypothesis asserting that companies will need a global content operating model that balances global efficiency with local control.
- ○○○○ Enterprises struggle with localization.
- ○○○○ Our study found that companies see value in a global content operating model regardless of the number of languages that need to be supported.

✎ SMART CHANNEL EDITOR

GlobalContentOperatingModal  #Forrester

☑ Twitter  ☒ Email  ☑ Blog — 316  320

Compose a Tweet — 326  310

Do you have a global content|  — 324

252 characters left   [ +Add ]  [ × Clear ]

❝ QUOTES — +  ⓘ ⊗ — 304

- companies see value in a global content operating model regardless of the number of languages that need to be supported
- companies will need a global content operating model that balances global efficiency with local control.
- nearly half of enterprises are planning to move to a global content operating model within 24 months, anticipating better brand consistency and improved customer experience.
- personalized home page promotions influenced 85% of consumers to buy will personalized shopping cart

📊 STATS — +  — 306

- Professionals in the....
- Forrester's study yielded five key findings:
- While only 19% of enterprises have a global content operating....
- ...plan to adopt one in the next two years.

FIG. 3C

**SDL* Copywriting Assistant**   eBOOK - Global Content Operating Model

☆ SUMMARY

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

♡ SPOTLIGHT

○ ○ ○ ○ ○ Forrester conducted in-depth surveys with 151 business and IT professionals in the US, and found that nearly half of enterprises are planning to move to a global content operating model within 24 months, anticipating better brand consistency and improved customer experience.

○ ○ ○ ○ ○ While only 19% of enterprises have a global content operating model today, an additional 48% plan to adopt one in the next two years.

○ ○ ○ ○ ○ A global content operating model can alleviate challenges and provide clear benefits.

○ ○ ○ ○ ○ Once a company has optimized its Global Content Operating Model, content drives experiences that meet customer expectations.

○ ○ ○ ○ ○ Forrester developed a hypothesis asserting that companies will need a global content operating model that balances global efficiency with local control.

○ ○ ○ ○ ○ Enterprises struggle with localization.

○ ○ ○ ○ ○ Our study found that companies see value in a global content operating model regardless of the number of languages that need to be supported.

❝ QUOTES

□ companies see value in a global content operating model regardless of the number of languages that need to be supported □ companies will need a global content operating model that balances global efficiency with local control.

□ nearly half of enterprises are planning to move a global content operating model with in 24 months, anticipating better brand consistency and improved customer experience.

□ personalized home page promotions influenced 85% of consumers to buy will personalized shopping cart

📊 STATS

□ Forrester's study yielded five key findings:

□ While only 19% of enterprises have a global content operating....

□ ...plan to adopt one in the next two years.

⚲ KEYWORDS

| | companies |
| □ | a global content operating model |
| □ | Global Content Operating Model |
| □ | a company |
| □ | consumers |
| □ | customers |

✎ SMART CHANNEL EDITOR

GlobalContentOperatingModal   #Forrester

🐦 Twitter  ✉ Email  📝 Blog

Compose a Tweet

Do you have a global content operating model strategy in place to drive greater customer experience? Get started with SDL eBook! #GlobalContentOperatingModel #Gl

FIG. 3D

**SDL* Copywriting Assistant**     eBOOK - Global Content Operating Model ▾     ⊘ ⊗

✎ SUMMARY   − +

Seventy percent of companies support five or more languages across not only websites, but also additional content types like product content and Pricing sheets, marketing content, technical information, and rich media like video. The Global Content Operating Model (GCOM) provides a comprehensive strategic approach to managing your content across departments by unifying platforms and processes to address global content creation, translation and delivery. Once a company has optimized its Global Content Operating Model, content drives experiences that meet customer expectations.

♀ SPOTLIGHT   − +

- ○○○○○ Forrester conducted in-depth surveys with 151 business and IT professionals in the US, and found that nearly half of enterprises are planning to move to a global content operating model within 24 months, anticipating better brand consistency and improved customer experience.
- ○○○○○ While only 19% of enterprises have a global content operating model today, an additional 48% plan to adopt one in the next two years.
- ○○○○○ A global content operating model can alleviate challenges and provide clear benefits.
- ○○○○○ Once a company has optimized its Global Content Operating Model, content drives experiences that meet customer expectations.
- ○○○○○ Forrester developed a hypothesis asserting that companies will need a global content operating model that balances global efficiency with local control.
- ○○○○○ Enterprises struggle with localization.
- ○○○○○ Our study found that companies see value in a global content operating model regardless of the number of languags that need to be supported.

🔍 QUOTES   − +

- □ companies see value in a global content operating model regardless of the number of languages that need to be supported
- □ companies will need a global content operating model that balances global efficiency with local control.
- □ nearly half of enterprises are planning to move a global content operating model with in 24 months, anticipating better brand consistency and improved customer experience.
- □ personalized home page promotions influenced 85% of consumers to buy will personalized shipping cart

📊 STATS   − +

- □ Forrester's study yielded five key findings:
- □ While only 19% of enterprises have a global content operating....
- □ ...plan to adopt one in the next two years.

#GlobalContentOperatingModal   #Forrester

✎ SMART CHANNEL EDITOR

🐦 Twitter   ✉ Email   📝 Blog

Compose a Tweet

[ Type your tweet here ]

280 characters left   [ +Add ]   [ × Clear ]

🔑 KEYWORDS   − + companies
- □ a global content operating model
- □ Global Content Operating Model
- □ a company
- □ consumers
- □ customers

FIG. 3E

SYSTEMS AND METHODS TO GENERATE MESSAGES USING MACHINE LEARNING ON DIGITAL ASSETS

CROSS REFERENCE TO RELATED APPLICATIONS

This application is a continuation of U.S. patent application Ser. No. 16/155,658, filed Oct. 9, 2018, entitled "Systems and Methods of Machine Learning for Digital Assets and Message Creation," which is hereby incorporated herein by reference in its entirety, including all references and appendices cited therein, for all purposes, as if fully set forth herein.

FIELD OF THE INVENTION

The present disclosure pertains to machine learning within the context of digital asset processing and message creation. Systems and methods disclosed herein are configured to ingest digital assets from a variety of sources, evaluate textual content of these digital assets, and automate (either partially or entirely) the creation of messages for distribution across one or more digital distribution platforms.

SUMMARY

A system of one or more computers can be configured to perform particular operations or actions by virtue of having software, firmware, hardware, or a combination of them installed on the system that in operation cause or causes the system to perform the actions. One or more computer programs can be configured to perform particular operations or actions by virtue of including instructions that, when executed by data processing apparatus, cause the apparatus to perform the actions. One general aspect includes a method, including: receiving one or more assets that comprise textual content; performing machine learning on the one or more assets in order to determine relevant words, phrases, and statistics included in the textual content, and generate a summary of the textual content; displaying on a graphical user interface: the relevant words based on frequency of occurrence in the one or more assets, each of the relevant words being selectable; the phrases, each of the phrases being selectable; the statistics, each of the statistics being selectable; segments of the textual content that have been extracted from the one or more assets based on selected ones of the relevant words, the phrases and the statistics; and an interface that is used to create a message using content from the segments of the textual content that have been extracted from the one or more assets. Other embodiments of this aspect include corresponding computer systems, apparatus, and computer programs recorded on one or more computer storage devices, each configured to perform the actions of the methods.

Another general aspect the method includes: performing machine learning on one or more assets having textual content in order to determine relevant words, phrases, and statistics included in the textual content, and generate a summary of the textual content; and displaying, on a graphical user interface, segments of the textual content that have been extracted from the one or more assets based on selected ones of the relevant words, the phrases and the statistics, and an interface that is used to create a message using content from the segments of the textual content that have been extracted from the one or more assets.

One general aspect includes a system, including: an asset analyzer module configured to receive one or more assets that comprise textual content; a machine learning module configured to perform machine learning on the one or more assets in order to determine relevant words, phrases, and statistics included in the textual content, and generate a summary of the textual content; a graphical user interface module configured to display on a graphical user interface: the relevant words based on frequency of occurrence in the one or more assets, each of the relevant words being selectable; the phrases, each of the phrases being selectable; the statistics, each of the statistics being selectable; segments of the textual content that have been extracted from the one or more assets based on selected ones of the relevant words, the phrases and the statistics; and an interface that is used to create a message using content from the segments of the textual content that have been extracted from the one or more assets.

Other embodiments of this aspect include corresponding computer methods and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIGS. 3A-3E collectively illustrate the use of a graphical user interface that displays various content extracted from input asset(s) and the automated (either partial or complete) authoring of messages based on the content extracted from input asset(s).

DETAILED DESCRIPTION

Figure 1:
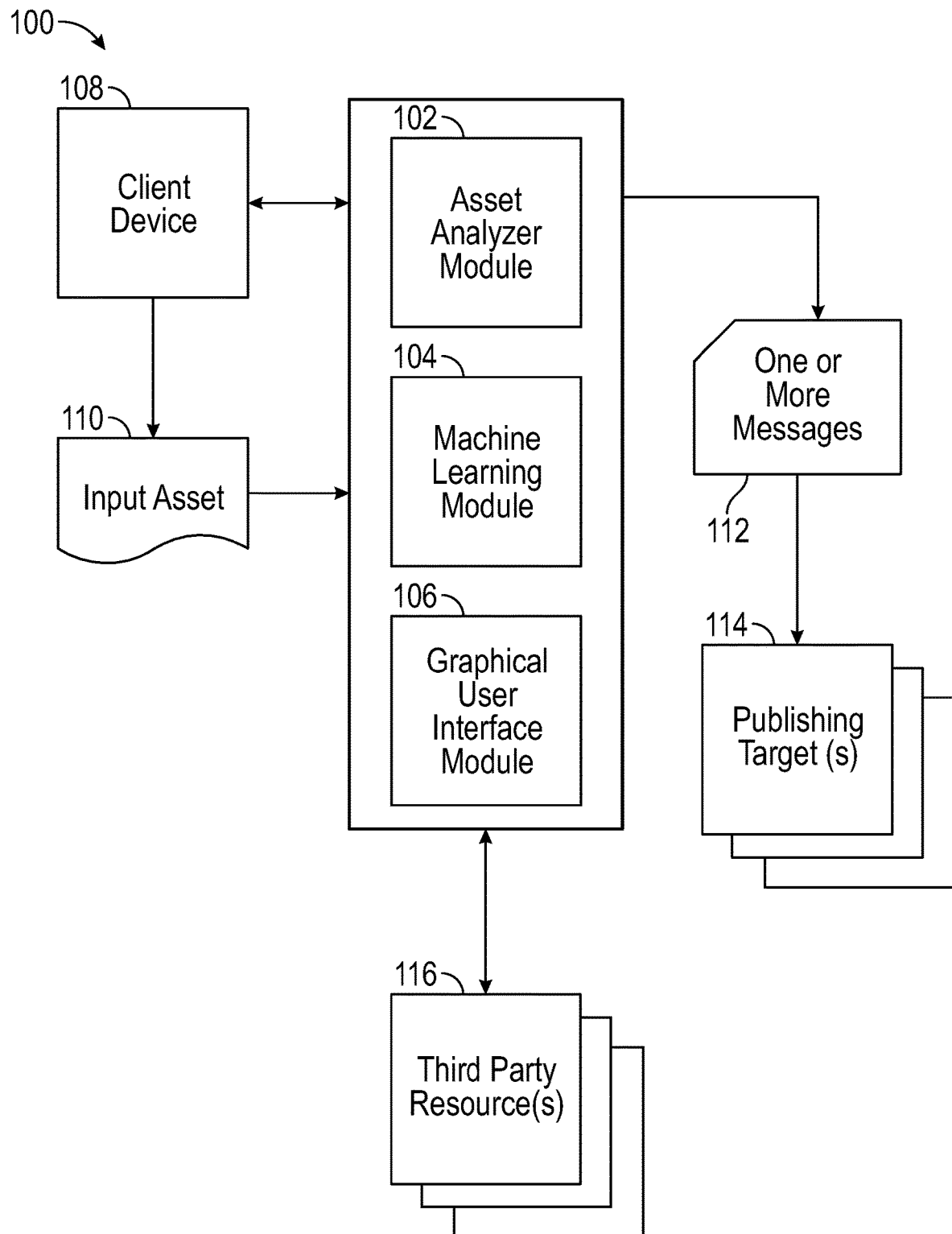
FIG. 1 is a schematic diagram of a system for use in practicing aspects of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

As noted above, the present disclosure is directed to systems and methods that are configured to ingest digital assets from a variety of sources, evaluate textual content of these digital assets, and automate (either partially or entirely) the creation of messages for distribution across one or more digital distribution platforms.

In general, the systems and methods herein provide an artificial intelligence (AI) or machine learning driven content creation assistant (referred to generally as a copyrighting assistant) that enables the automated creation of messages for distribution across one or more channels of communication. Example communications channels include, but are not limited to, social networks (such as Twitter™, Facebook™, and so forth), email, blogs, and webpage—just to name a few.

The systems and methods disclosed herein provide a technical solution to a problem within the field of automated content creation. To be sure, content creation is a cumbersome and time consuming process. Often times, messages for use on social media or other mediums are created from more comprehensive digital assets such as technical papers or website content. As such, the content of messages created from these more comprehensive digital assets are controlled by the subjective biases of the author. That is, the author uses their best judgement in order to create compelling content for their messages. This is especially difficult when the content author is not a subject matter expert relative to the content in the comprehensive digital asset(s).

The systems and methods herein overcome these subjective drawbacks by incorporating machine learning/AI capabilities that can utilize a ruleset or model in order to pre-process comprehensive digital assets (referred to generally as input assets) and automatically convert (either partly created or wholly) those assets into messages that can be automatically distributed to one or more publishing targets.

The systems and methods enable the generation of relevant content and variations thereof without requiring an author to possess the full subject matter expertise of the author who created the comprehensive digital assets. This allows for efficient and quick creation of relevant content that is distributed to various channels and/or to various audiences. These and other advantages of the present disclosure are provided in greater detail infra with reference to the collective drawings.

FIG. 1 is a schematic diagram of an example system 100 that can be utilized to practice aspects of the present disclosure. The system 100 generally comprises an asset analyzer module 102, a machine learning module 104, and a graphical user interface module 106. It will be understood that the modules of the system 100 can be aggregated into a single physical or virtual machine in some embodiments, such as a server. In other embodiments, the modules of the system 100 can be distributed across a plurality of physical or virtual machines, such as a cloud.

In some embodiments, the system 100 is configured for interaction with one or more client devices, such as client device 108. The client device 108 can include any end-user computing device such as a laptop or smartphone. The client device 108 can interact with the system 100 in a server/client relationship, in some embodiments, through the use of graphical user interfaces (GUIs) as disclosed herein. The GUIs can be delivered through an application that resides and executes on the client device 108. Alternatively, the GUIs can be accessed by the client device 108 through a web-based form provided by the graphical user interface module 106.

As noted above, the system 100 is configured generally to utilize AI/machine learning in order to allow an author to partially or completely automate the creation of message content based on one or more input assets. For example, if a company creates a technical document that describes a new offering or service, the system 100 can ingest that input asset 110 and perform a variety of machine learning processes on that input asset 110 in order to convert that input asset 110 into one or more messages 112 that are then published to one or more publishing targets 114.

Content of one or more messages 112 created by the system 100 is created from content extracted from an input asset 110 and processed by the system 100 using machine learning. The input asset 110 is ingested and analyzed by the system 100 to extract information such as key topics (words/phrases), facts, statistics, quotes, and so forth. These extracted data are used to pre-populate the content of the one or more messages 112 in some embodiments. In other embodiments, the information extracted from the input asset 110 can be placed into various windows of a GUI that a message author uses to create the one or more messages 112. To be sure, in some embodiments, the system 100 can evaluate more than one input asset 110 at a time using machine learning.

Figure 2:
FIG. 2 is a graphical user interface that allows a message author to input or select an input asset.

Referring now collectively to FIGS. 1 and 2, in more detail, the graphical user interface module 106 can be executed to generate a GUI 200 that allows a message author to input or select the input asset 110, which in this example includes a technical document titled "Global Content Operating Manual" reflected in the name dialogue area. Documents are selected using a button 202. The button 202 allows the message author to search and select documents either locally (on the client device 108) or remotely. The GUI 200 allows the user to select one or more channels 204 for distribution of any messages generated in response to the processing of the input asset 110 by the system 100.

In general the input asset 110 (e.g., one or more assets) comprises textual content. The input asset 110 or assets can be obtained from a third party resource 116 (see FIG. 1). In some instances, a third party resource can include any repository of assets having content that is related to the content included in the input asset 110. That is, a user can select the input asset 110. The machine learning module 104 can process textual content of the input asset 110 and use content extracted from the input asset 110 such as keywords/phases, statistics, facts, quotes, and other data as the basis for searching the Internet or another third party document repository for additional input asset(s) that have content which is similar in subject matter to the input asset 110 selected by the user.

In one specific example, content extracted from the input asset 110 selected by the user can be used as a query that is searched against the one or more publishing targets 114 that will ultimately receive the message created through the system 100. For example, content such as keywords extracted from the Global Content Operating Manual can be used as the basis of a query that is executed against a social network where a message will eventually be published. The asset analyzer module 102 of the system 100 can utilize an application programming interface (API) to connect to the third party resource 116 (or one or more publishing targets 114), which in this example is a social network. Results from the query can include content found on the social network that corresponds to the keywords extracted from the input asset 110. The content obtained from the social network by the asset analyzer module 102 can be combined with the input asset 110 and analyzed collectively by the machine learning module 104. In sum, the corpus of content that is used to generate messages by the system 100 can be extended by searching various third party resources, some of which can include the channels (e.g., publishing targets) where messages are published by the system 100.

Stated otherwise, the system 100 can utilize an application programming interface (or equivalent) to search social networks (or other third party sites) for third party content that matches the one or more input assets. The system 100 will effectively incorporate the third party content with the one or more input assets during the machine learning such that the relevant words, phrases, and statistics (or other types of extracted content) are based on both the one or more input assets and the third party content in combination.

The textual content extracted from the one or more input assets (whether selected by the user and/or found in a search) is ultimately processed using the machine learning module 104. In more detail, the machine learning module 104 is configured to perform AI processing on the one or more assets in order to determine content that is indicative of subject matter included in the one or more assets. In some embodiments, the machine learning module 104 can utilize a ruleset in order to define types of content that are located and/or extracted from within the one or more assets.

In some embodiments, the machine learning module 104 is utilized to determine content such as relevant words, phrases, quotes facts, statistics included in the textual content of the machine learning module 104. In various embodiments, the machine learning module 104 can generate a summary of the textual content included in each discrete input asset.

In one embodiment, relevant words or phrases can be determined from a frequency or word count. That is, if a word is repeated numerous times in a document it is likely to be important and indicative of the subject matter of the input asset. The machine learning module 104 can exclude nonce words such as articles and other repetitive content that are not likely to be indicative of the subject matter included in the asset(s).

Other rules can be used that search for quotations or facts/statistics that are determined by looking for numerical characters in combination with certain words or phrases or even symbols. Using a sentence "45% of users experienced latency", the number 45 is located near a phrase "users experienced." Thus it can be inferred that the number in combination with phrase is relevant as a statistic. The presence of the % symbol also adds weight to this inference. Additional examples of content extracted from the example input asset are illustrated and described in greater detail with respect to FIGS. 3A-3E, each of which is disclosed infra.

Figure 3A:
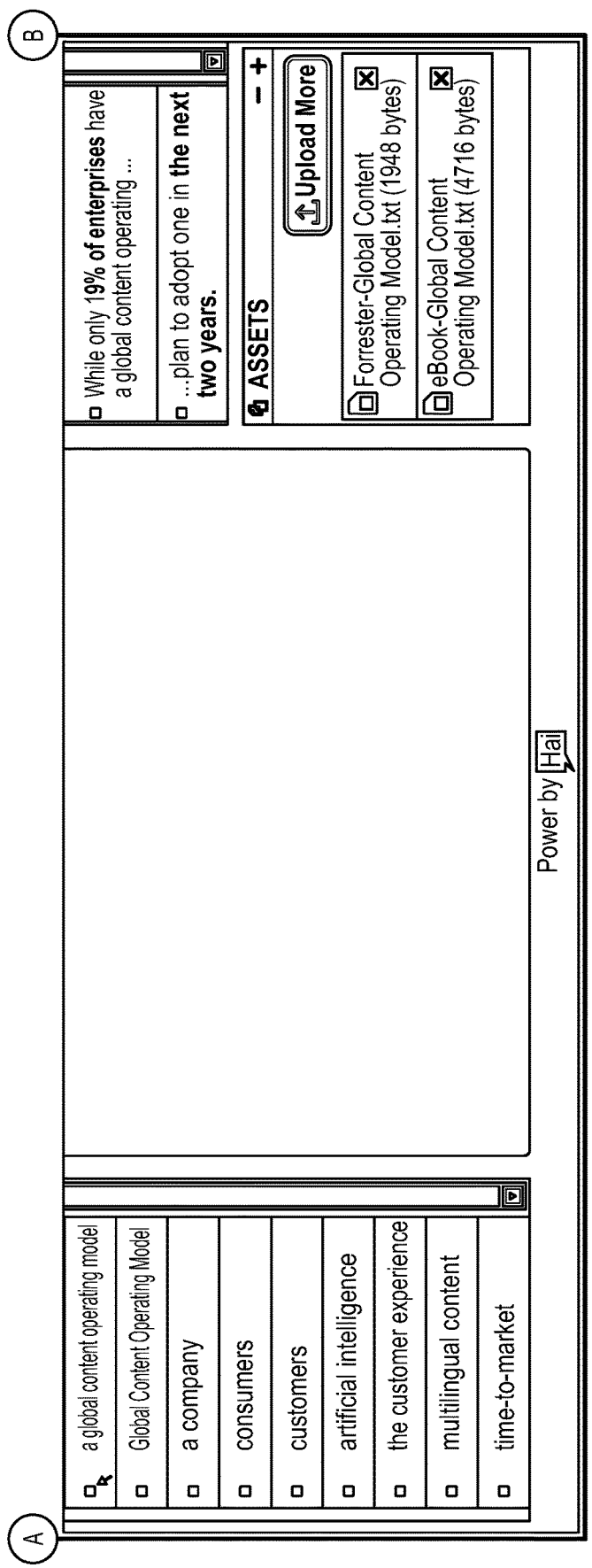

Once the various types of content have been extracted from the one or more assets, the graphical user interface module 106 is then executed to provide a copyrighting assistant interface (herein after GUI 300) as illustrated in FIG. 3A. Generally, the GUI 300 generally comprises various windows that include extracted content and/or mechanisms for selecting and otherwise interacting with said extracted content.

In one embodiment, the GUI 300 includes a first window 302, a second window 304, a third window 306, a fourth window 308, a fifth window 310, and a sixth window 312. Each of these windows and their corresponding extracted content are disclosed in greater detail below.

In general, relevant words and phrases are displayed in the first window 302 of the GUI 300 and other specific phrases such as quotes are displayed in the second window 304 of the GUI 300. In some embodiments, the keywords displayed in the first window 302 are extracted from the one or more input assets and are displayed according to a frequency of occurrence in the underlying assets. Thus, in the Global Content Operating Manual, the words "content" and "companies" are found more frequently than any other words. Instead of displaying the keywords and phrases in an ordered list, such content can be displayed as a word cloud, with more frequently occurring words/phrases being larger in font size or color. Each of the items listed in the first window 302 are selectable using, for example a check box 314. Moreover, based on machine learning, one or more of the items listed in the first window 302 can be associated with an icon. For example, a relevant word of "Forrester" that is indicative of a person's name is provided with a human icon. This name appears frequently in the input asset.

The quotes located in the second window 304 are also each associated with a selectable check box. These quotes include individual, stand-alone phrases that reflect valuable textual information included in the underlying assets. Often, these quotes comprise one or more of the keywords/phrases found in the first window 302. In some embodiments, the quotes included in the second window 304 are updated in real-time based on the selections of keywords/phrases in the first window 302.

In some embodiments, statistics are displayed in the third window 306. The statistics include content that is indicative of or associated with a numerical value, but the items listed in the third window 306 include additional characters in a string in which the numerical value is found. As noted above, the machine learning module 104 includes rules that identify words or phrases that are indicative of a statistic. Once found the graphical user interface module 106 can list strings of words, such as sentences or sub-sentence phrases that include the statistics. The relevant statistic of a sentence or sub-sentence phrase can be set off in bold. Moreover, each of the items in the list of third window 306 is selectable through a check box.

Various embodiments include the fourth window 308 that includes segments of content. As noted above, the content displayed in the various windows 302-306 is selectable by a user of the GUI 300. The segments of content displayed in the fourth window 308 are populated in response to the items selected from one or more of the windows 302-306. That is, the user can select which items from the various windows are of interest. Once selected, the system 100 (see FIG. 1) will populate the fourth window 308 with segments of content as illustrated in FIG. 3B, which will be described in greater detail below.

Generally, the GUI 300 also includes a smart channel editor 316 in the fifth window 310. The smart channel editor 316 is a mechanism configured to allow a user to compose a message (either in whole or in part) based on the content provided in the various windows of the GUI 300. Users can base the content of the message on segments of content displayed in the fourth window 308. In some instances, the message that is composed is created using the machine learning module 104.

For example, in FIG. 3B, the phrase "a global content operating model" is selected by the user from the first window 302. This selection causes the system 100 (through cooperation of the machine learning module 104 and the graphical user interface module 106) to display segments of content 318 in the fourth window 308. The segments of content 318 include quotations of content extracted from the underlying input asset that correspond to the selection of the user. This action fine-tunes the most relevant content found in the underlying input asset that is of interest to the user. The segments of content 318 are listed in order of relevancy to the items selected by the user. That is, the machine learning module 104 can generate a relevancy score for each segment selected for the fourth window 308. In some embodiments, the relevancy score is represented as a series of dots placed by a segment. A segment having all five dots darkened is a highly relevant (high relevancy score) segment. Again, the relevancy score is related to how well content extracted from the input asset(s) matches the items selected by the user. For example, the segment of "A global content operating model can alleviate challenges and provide clear benefits" was found to be highly relevant to the select item of "a global content operating model" selected by the user from the first window 302.

In some embodiments, the content of the message is populated, in whole or in part, by the machine learning module 104 (see FIG. 1) of the system 100 based on the selections of the user. That is, once the user has selected items from any of the various windows, the machine learning module 104 can pre-populate the smart channel editor 316 with textual content from the segments of content 318. As a default setting, the machine learning module 104 can select the most relevant item in the segments of content 318 as an initial message. In some embodiments, rather than copying content verbatim from the segments of content 318, the machine learning module 104 can also apply natural language processing rules to convert content in a segment to a more linguistically appropriate format. For example, if the content in a segment is a fragment or run-on, the machine learning module 104 can utilize natural language processing rules to convert such content into a well-formed sentence. The machine learning module 104 could also use native knowledge regarding the site to which the message will be published in order to reformat the segment. For example, if the site to which a message is published is a social network with a character limit, the machine learning module 104 can truncate or reword a segment to comply with that character limit.

In sum, the machine learning module 104 is configured to automatically generate a message through use of a message creation ruleset. This message creation ruleset can define format, layout, style, linguistic, or other parameters of an automated message that define how relevant content from the input asset(s) are converted into a message.

The automation of message creation from more comprehensive input assets allows for rapid dissemination of the messages into social media or other platforms that benefit from rapid or frequent content sharing in order to drive customer or viewer engagement without the use of human input (or very limited human input). In some embodiments, the system 100 populates automatically generated messages to a queue for subsequent distribution (see FIG. 3E). Thus, a human may only be required to review AI generated messages in the queue before publishing. If messages are edited prior to publishing, the message can be processed by the machine learning module 104 in order to update the message creation ruleset in order to produce more suitable messages in the future. Thus, the machine learning module 104 learns from user feedback and edits in order to improve the future format or content of messages.

Also, part of the message creation ruleset used by the machine learning module 104 can include message scheduling which determines how often messages are created and disseminated by the system 100. This type of information can be determined through analysis of trends of competitors and other suitable information sources or corporate policies.

In some embodiments, the machine learning module 104 can not only generate segments of interest, but the machine learning module 104 can also create ancillary or collateral content for use in a message. These can also be based on native knowledge regarding the site to which the message will be published. For example, the machine learning module 104 can create hashtags 320 based on the relevant segments provided in the fourth window 308.

In some embodiments, the sixth window 312 of the GUI 300 comprises a summary of the input assets (user selected and/or third party content) that provide a user with a summary of the subject matter included in the input assets. This allows a user with limited domain knowledge to effectively create messages. This can also assist a user who is reviewing automatically generated AI messages produced by the system 100.

In various embodiments, the GUI 300 can also include a seventh window 322 that identifies the input assets used to generate the content included in the GUI 300. The user can remove or add input assets as desired through this seventh window 322.

Figure 3C:
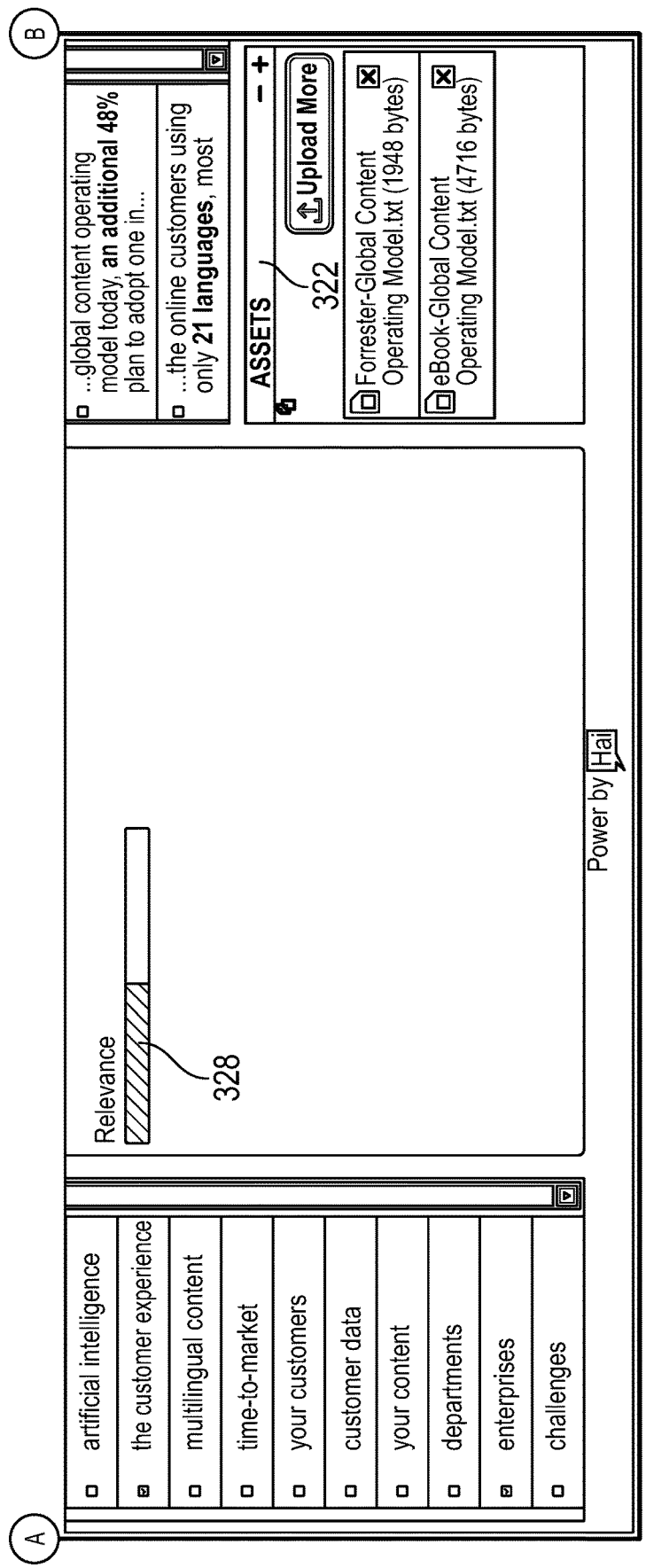
Figure 3D:
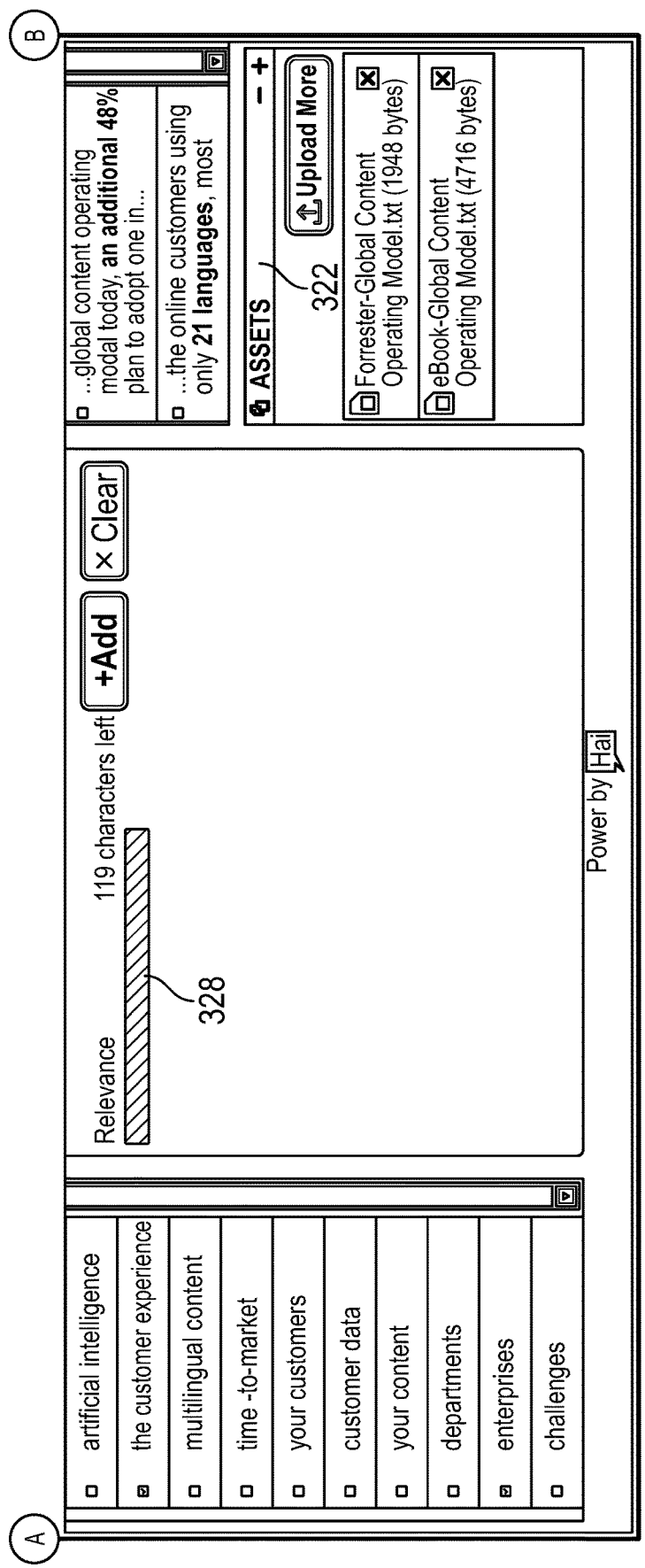
Figure 3E:
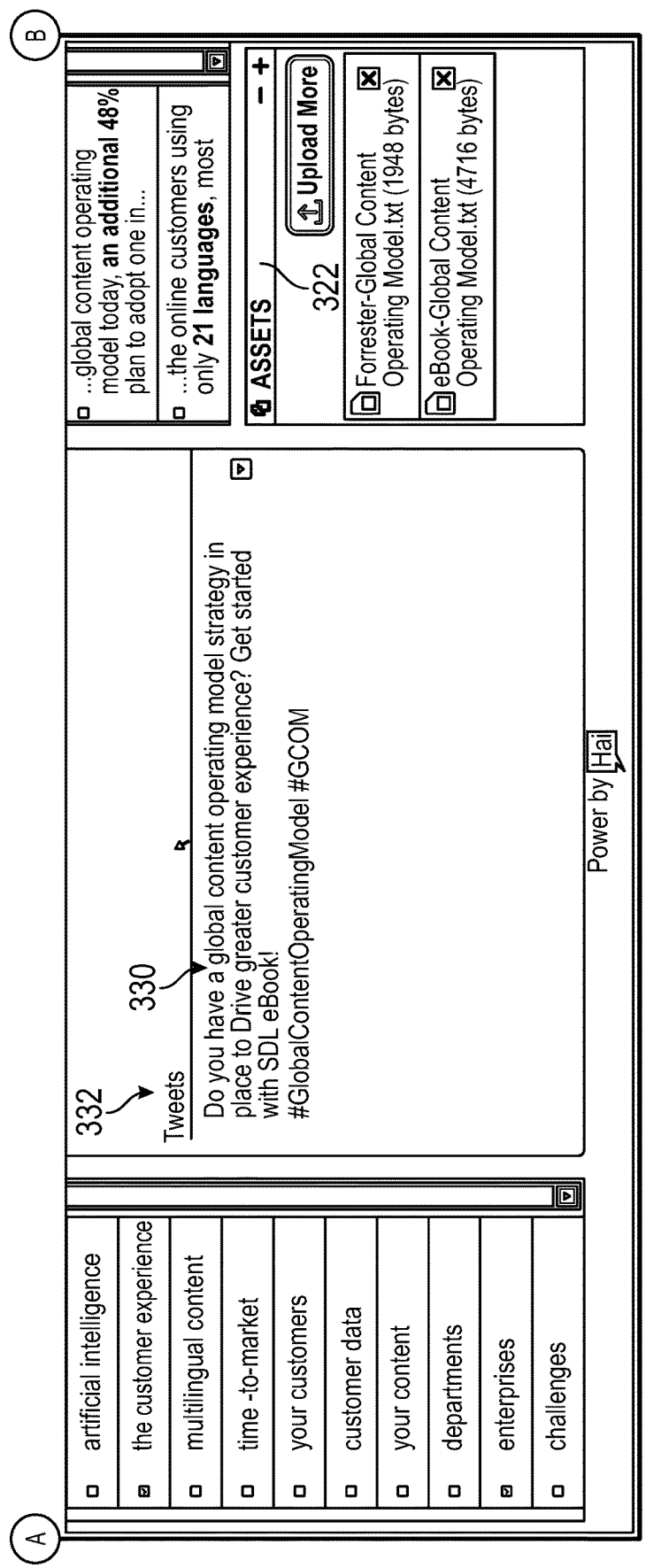

FIG. 3C illustrates the GUI 300 and specifically the use of the smart channel editor 316. The smart channel editor 316 includes a text input box 324 that can be filled with content either by the system 100 or by a user. For example, the text input box 324 can be filled with message content 326. As the text input box 324 box is filled with message content, the system 100 (and specifically the machine learning module 104) generates a real-time relevancy score that indicates how relevant the message content is relative to the items selected by the user from the various windows of the GUI 300 (note that the items selected in FIG. 3C vary from those selected in FIGS. 3A-3B). FIG. 3C illustrates the message content as it is being created with a relatively mid-range relevancy score as notated or illustrated by way of a relevancy progress bar 328. This is in contrast with the completed message content 330 illustrated in FIG. 3D. As noted above, the completed message content 330 illustrated in FIG. 3D includes an AI generated hashtag 320. This completed message content 330 is added to a queue 332 as illustrated in FIG. 3E.

Figure 4:
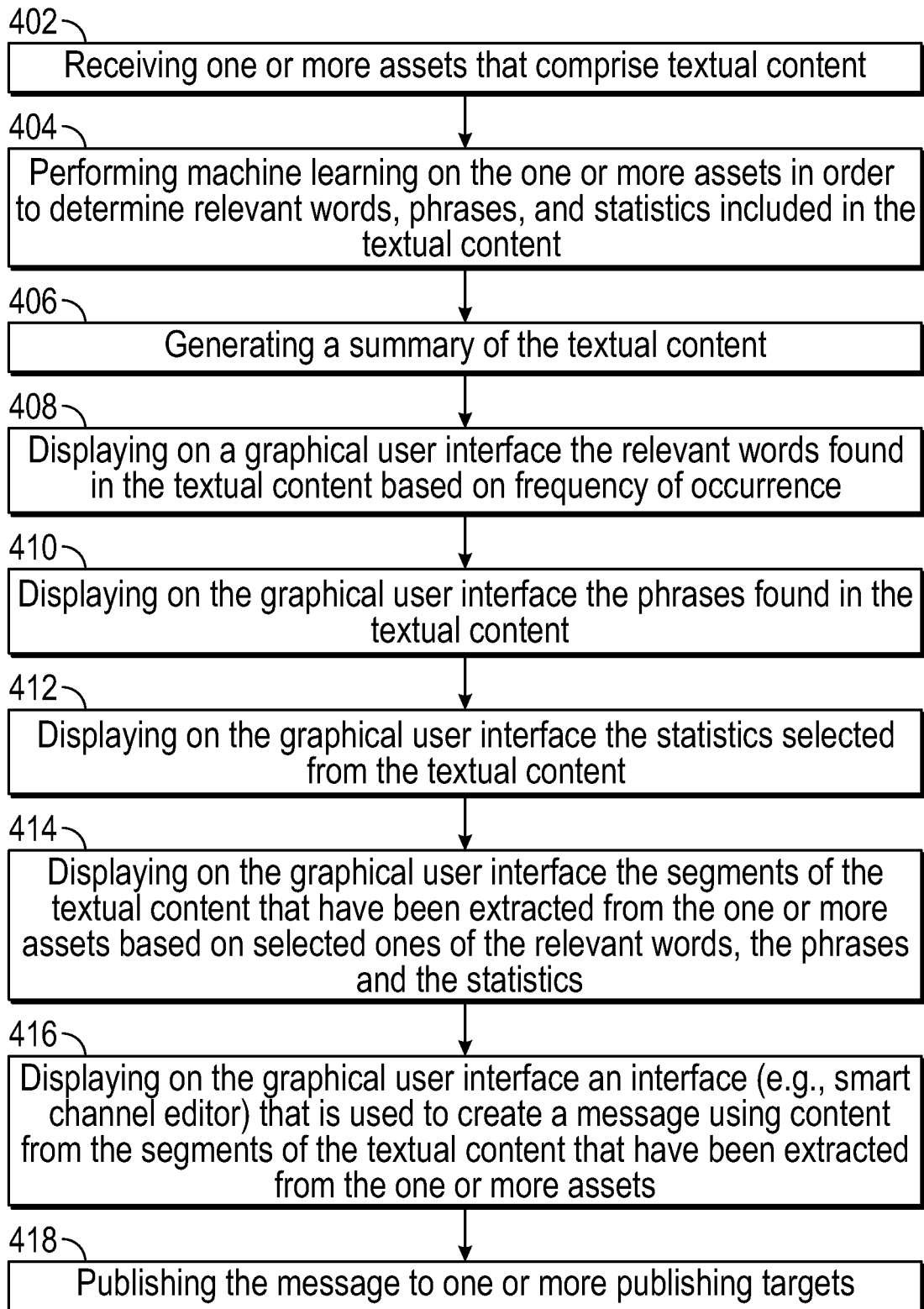
FIG. 4 is a flowchart of an example method of the present disclosure.

FIG. 4 is a flowchart of an example method of the present disclosure. The method includes a step 402 of receiving one or more assets that comprise textual content. Again, this can include assets identified by a user and/or assets obtained from a third party resource as well. Next, the method includes a step 404 of performing machine learning on the one or more assets in order to determine relevant words, phrases, and statistics included in the textual content. The method can also include a step 406 of generating a summary of the textual content.

In various embodiments, the method can include a step 408 of displaying on a graphical user interface the relevant words found in the textual content based on frequency of occurrence. To be sure each of the relevant words is selectable by the user. Next, the method includes a step 410 of displaying on the graphical user interface the phrases found in the textual content. Again, each of the phrases is selectable. The phrases can include quotes in some embodiments.

In one or more embodiments, the method includes a step 412 of displaying on the graphical user interface the statistics selected from the textual content. The statistics can be displayed in the context of the sentence or word string in which they appear in the textual content.

The method includes a step 414 of displaying on the graphical user interface the segments of the textual content that have been extracted from the one or more assets based on selected ones of the relevant words, the phrases and the statistics.

As noted above, the method can also include a step 416 of displaying on the graphical user interface an interface (e.g., smart channel editor) that is used to create a message using content from the segments of the textual content that have been extracted from the one or more assets. To be sure, the message content created in the smart channel editor includes either AI or user generated messages. In one or more embodiments, the method can also include a step 418 of publishing the message to one or more publishing targets.

Figure 5:
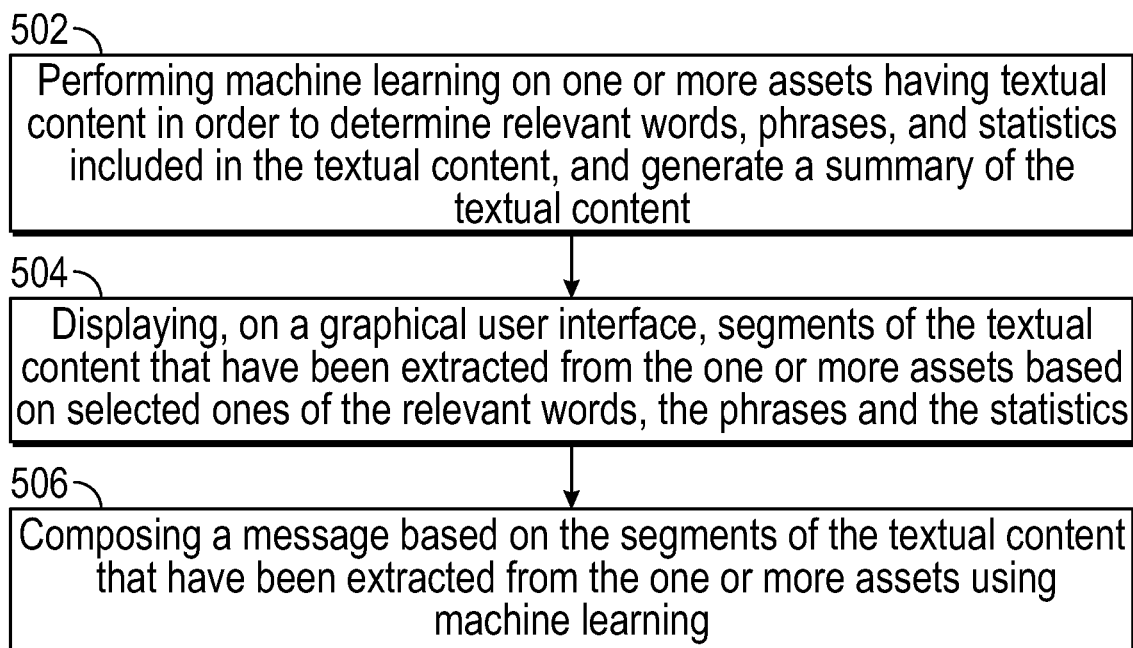
FIG. 5 is a flowchart of another example method of the present disclosure.

FIG. 5 is a flowchart of another example method of the present disclosure. The method generally includes a step 502 of performing machine learning on one or more assets having textual content in order to determine relevant words, phrases, and statistics included in the textual content, and generate a summary of the textual content. The method also includes a step 504 of displaying, on a graphical user interface, segments of the textual content that have been extracted from the one or more assets based on selected ones of the relevant words, the phrases and the statistics.

The method further includes a step of 506 composing a message based on the segments of the textual content that have been extracted from the one or more assets using machine learning. In some embodiments an interface is presented that (e.g., smart channel editor) is used to create or edit an AI generated message prior to publishing.

Figure 6:
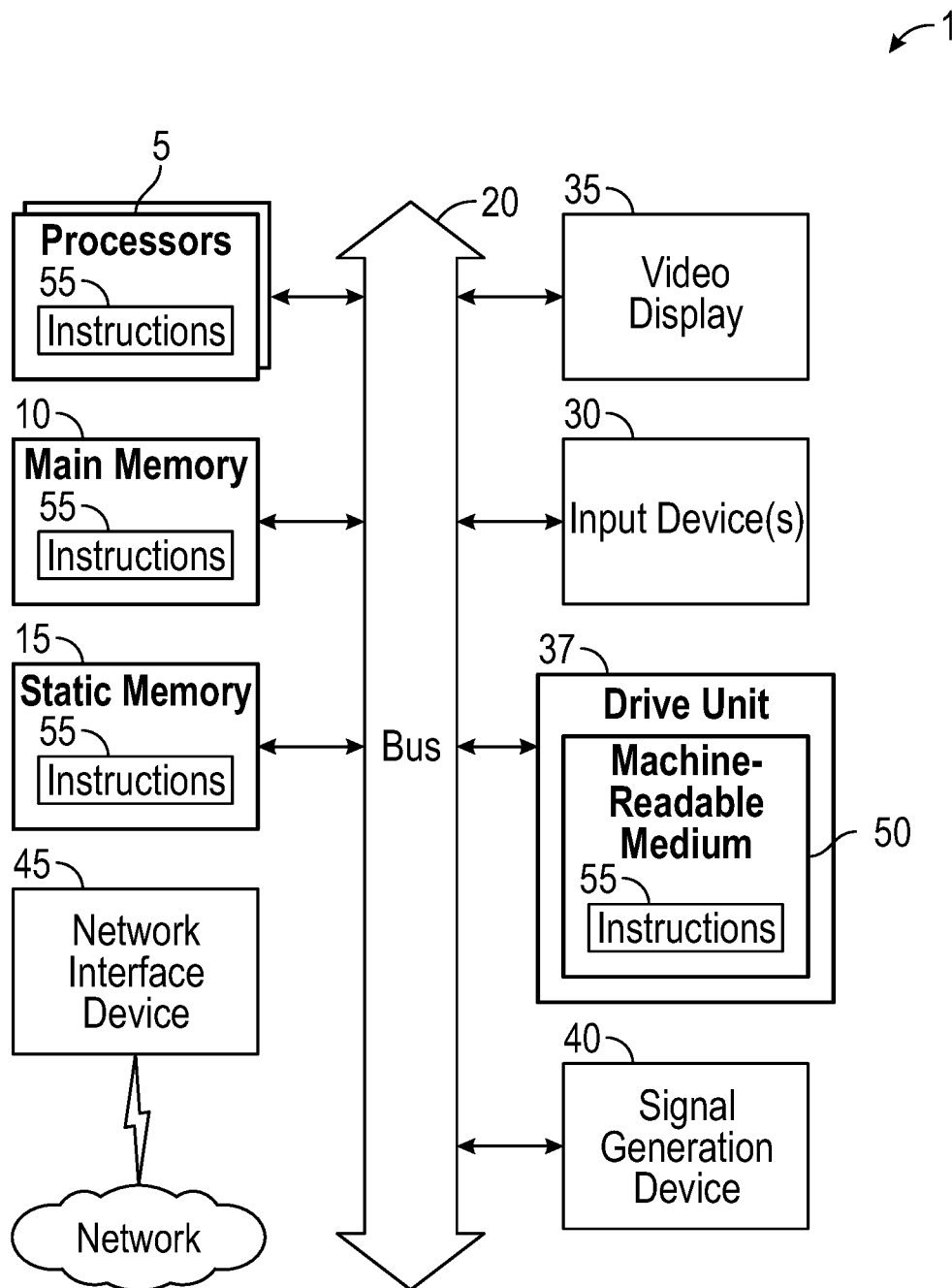
FIG. 6 is a schematic diagram of an example computing system that may be used to implement embodiments disclosed in accordance with the present disclosure.

FIG. 6 illustrates an example computer system 1 that can be utilized for machine learning for digital assets and message creation. That is, the computer system 1 can implement the AI/machine learning of the present disclosure.

The computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technology in the form disclosed. Many modifications and variations will be apparent to those of ordinary skill in the art without departing from the scope and spirit of the technology. Exemplary embodiments were chosen and described in order to best explain the principles of the present disclosure and its practical application, and to enable others of ordinary skill in the art to understand the technology for various embodiments with various modifications as are suited to the particular use contemplated.

Aspects of the present disclosure are described above with reference to flowchart illustrations and/or block diagrams of methods, apparatus (systems) and computer program products according to embodiments of the technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

While the present disclosure has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method, comprising:
receiving one or more assets that comprise textual content;
performing machine learning on the one or more assets in order to determine relevant words, phrases, and statistics included in the textual content, and generating a summary of the textual content;
receiving feedback from an editor with respect to the summary;
incorporating the feedback into the machine learning;
automatically generating a message using the machine learning through use of a message creation ruleset; and
displaying on a graphical user interface:
the relevant words, the phrases, and the statistics;
segments of the textual content that have been extracted from the one or more assets based on the relevant words, the phrases, and the statistics; and
an interface that is used to create the message using content from the segments of the textual content that have been extracted from the one or more assets, wherein the machine learning applies natural language processing rules to convert a run-on or a fragment, in at least one of the segments of the textual content, into a sentence.

2. The method according to claim 1, wherein the relevant words are displayed in a first window of the graphical user interface and the phrases are displayed in a second window of the graphical user interface.

3. The method according to claim 2, wherein the statistics are displayed in a third window, the segments are displayed in a fourth window, and the interface is displayed in a fifth window.

4. The method according to claim 3, wherein the graphical user interface further comprises a sixth window that comprises the summary of the textual content.

5. The method according to claim 4, wherein the machine learning is configured to generate relevancy scores for each of the segments based on a user's selection of at least one of the relevant words, the phrases, and the statistics.

6. The method according to claim 5, wherein the machine learning is configured to generate hashtags from the relevant words, the hashtags being displayed in the fourth window, further wherein the hashtags are incorporated into the message in the interface when selected from the fourth window.

7. The method according to claim 6, further comprising adding the message to a queue for distribution.

8. The method according to claim 1, further comprising:
utilizing an application programming interface to search social networks for third party content that match to the one or more assets; and
incorporating the third party content with the one or more assets during the machine learning such that the relevant words, the phrases, and the statistics are based on both the one or more assets and the third party content.

9. The method according to claim 1, further comprising generating a real-time relevancy score that indicates how relevant the content of the message is relative to a user's selections made through the graphical user interface.

10. The method according to claim 1, wherein the machine learning further creates ancillary or collateral content for use in the message.

11. A system, comprising:
an asset analyzer module configured to receive one or more assets that comprise textual content;
a machine learning module configured to:
perform machine learning on the one or more assets in order to determine relevant words, phrases, and statistics included in the textual content, and generate a summary of the textual content;
receive feedback from an editor with respect to the summary;
incorporate the feedback into the machine learning; and
automatically generate a message using the machine learning through use of a message creation ruleset; and
a graphical user interface module configured to display on a graphical user interface:
the relevant words, the phrases, and the statistics;
segments of the textual content that have been extracted from the one or more assets based on the relevant words, the phrases, and the statistics; and
an interface that is used to create the message using content from the segments of the textual content that have been extracted from the one or more assets, wherein the machine learning applies natural language processing rules to convert a run-on or a fragment, in at least one of the segments of the textual content, into a sentence.

12. The system according to claim 11, wherein the relevant words are displayed in a first window of the graphical user interface and the phrases are displayed in a second window of the graphical user interface.

13. The system according to claim 12, wherein the statistics are displayed in a third window, the segments are displayed in a fourth window, and the interface is displayed in a fifth window.

14. The system according to claim 13, wherein the graphical user interface further comprises a sixth window that comprises the summary of the textual content.

15. The system according to claim 14, wherein the machine learning module is further configured to generate relevancy scores for each of the segments based on a user's selection of at least one of the relevant words, the phrases, and the statistics.

16. The system according to claim 15, wherein the machine learning module is further configured to generate hashtags from the relevant words, the hashtags being displayed in the fourth window, further wherein the hashtags are incorporated into the message in the interface when selected from the fourth window.

17. The system according to claim 16, wherein the graphical user interface module is further configured to add the message to a queue for distribution.

18. The system according to claim 17, wherein the asset analyzer module is further configured to:
utilize an application programming interface to search social networks for third party content that match to the one or more assets; and
incorporate the third party content with the one or more assets during the machine learning such that the relevant words, the phrases, and the statistics are based on both the one or more assets and the third party content.

19. The system according to claim 18, wherein the machine learning module further utilizes native knowledge regarding a site to which the message will be published in order to reformat a segment of the textual content.

20. A method, comprising:
performing machine learning on one or more assets having textual content in order to determine relevant words, phrases, and statistics included in the textual content, and generate a summary of the textual content;
displaying, on a graphical user interface, segments of the textual content that have been extracted from the one or more assets based on the relevant words, the phrases, and the statistics, and an interface that is used to create a message using content from the segments of the textual content that have been extracted from the one or more assets;
receiving feedback from an editor with respect to the summary;
incorporating the feedback into the machine learning;
automatically generating the message using the machine learning through use of a message creation ruleset; and
applying natural language processing rules by the machine learning to convert a run-on or a fragment, in at least one of the segments of the textual content, into a sentence.

21. The method of claim 20, further comprising reformatting a segment by the machine learning utilizing native knowledge regarding a site to which the message will be published.

* * * * *